United States Patent
Ninomiya et al.

[11] Patent Number: 6,083,575
[45] Date of Patent: Jul. 4, 2000

[54] POLYMER DISPERSION TYPE LIQUID CRYSTAL ELEMENT AND MANUFACTURING METHOD THEREOF

[75] Inventors: Masanobu Ninomiya, Minamiashigara; Shigeru Yamamoto, Nakai-machi; Takehito Hikichi, Nakai-machi; Kiyosui Sagawa, Nakai-machi; Naoki Hiji, Nakai-machi; Tei-ichi Suzuki, Nakai-machi, all of Japan

[73] Assignee: Fuji Xerox Co., Ltd., Tokyo, Japan

[21] Appl. No.: 09/188,145

[22] Filed: Nov. 9, 1998

[30] Foreign Application Priority Data

Nov. 19, 1997 [JP] Japan ................. 9-334973

[51] Int. Cl.[7] .............. C09K 19/00; C09K 19/52; G02F 1/133
[52] U.S. Cl. .............. 428/1.1; 349/187; 252/299.01
[58] Field of Search .............. 252/299.01; 349/187; 428/1.1

[56] References Cited

U.S. PATENT DOCUMENTS

| | | | |
|---|---|---|---|
| 5,188,760 | 2/1993 | Hikmet et al. | 252/299.01 |
| 5,357,356 | 10/1994 | Konuma et al. | 359/52 |
| 5,679,414 | 10/1997 | Akashi et al. | 428/1 |
| 5,785,889 | 7/1998 | Greenfield et al. | 252/299.01 |
| 5,978,064 | 11/1999 | Nishiguchi | 349/156 |

FOREIGN PATENT DOCUMENTS 5-281527  10/1993  Japan .

OTHER PUBLICATIONS

Shimada, E. et al., "S18–4 Improvement of Hysteresis in Polymer Dispersed Liquid Crystal (PDLC) by Control of Polymer Orientation," Japan Display '92, pp. 699–702, 1992.

Sutherland, R. L., "Optical Limiters, Switches, and Filters Based on Polymer Dispersed Liquid Crystals," SPIE vol. 1080 Liquid Crystal Chemistry, Physics, and Applications (1989), pp. 83–90.

Nazarenko, V.G. et al., "Oriented Dispersion of Liquid Crystal Droplets in a Polymer Matrix with Light Induced Anisotropy," Mol. Mat., 1993, vol. 2, pp. 295–299.

*Primary Examiner*—C. H. Kelly
*Attorney, Agent, or Firm*—Oliff & Berridge, PLC

[57] ABSTRACT

A polymer dispersion type liquid crystal element having a sufficient reflectance and having a layered structure in which a refractive index changes periodically inside, as well as a manufacturing method thereof. The polymer dispersion type liquid crystal element is manufactured by applying laser interference light to a polymerizable composition containing a polymerizable compound having a photo-dimerizable structure and low molecular liquid crystals to conduct polymer phase separation and then applying polarized light to manufacture a polymer dispersion type liquid crystal element in which low molecular liquid crystals are oriented.

30 Claims, 7 Drawing Sheets

IRRADIATION OF LASER INTERFERENCE LIGHT 11

IRRADIATION OF POLARIZED LIGHT 12

(a) COATING STEP (b) LIGHT OR HEAT APPLICATION STEP (POLYMER PHASE SEPARATION)

(c) POLARIZED LIGHT IRRADIATION STEP (PHOTO-DIMERIZATION)

(d) COATING STEP (e) POLYMER PHASE SEPARATION STEP (f) POLARIZED LIGHT IRRADIATION STEP (g) STRUCTURE OF PRESENT INVENTION (a) COATING STEP (b) POLARIZATION LIGHT IRRADIATION STEP (POLYMER SEPARATION & PHOTO-DIMERIZATION)

(c) COATING STEP (d) POLARIZED LIGHT IRRADIATION STEP (POLYMER PHASE SEPARATION & PHOTO-DIMERZATION)

(e) STRUCTURE OF PRESENT INVENTION

POLYMER DISPERSION TYPE LIQUID CRYSTAL ELEMENT AND MANUFACTURING METHOD THEREOF

BACKGROUND OF THE INVENTION

1. Field of the Invention

The present invention concerns a polymer dispersion type liquid crystal element capable of controlling reflectance and transmittance by the application of an electric field or a magnetic field, as well as a manufacturing method thereof. The polymer dispersion type liquid crystal element manufactured by the present invention is applicable as optical elements such as displays, light control elements and light modulation elements.

2. Related Art Statement

As a display element and a light control element, a polymer dispersion type liquid crystal (PDLC) in which liquid crystals are dispersed in interstices of polymers of a three-dimensional structure as shown in FIG. 1 has been studied. In PDLC, incident light is refracted at an interface due to the difference between a refractive index of the liquid crystal in the interstice and a refractive index of the polymer and passes through a number of droplets in the entire film to provide a scattered state in a state not applied with voltage (FIG. 1 (a)). On the other hand, when the voltage is applied, the liquid crystals are oriented perpendicular to a substrate in which the refractive index in the direction of the major axis is aligned with the refractive index of the polymer to provide a transparent state (FIG. 1(b)). The technique of PDLC requires no polarization plate, for which application to a projector light bulb is studied and bright display is expected.

The structure of the three-dimensional polymers includes those having interstices in which liquid crystals are distributed are present independent of each other or distributed continuously. As the method of manufacturing such polymer dispersion type liquid crystals, the following methods, generally classified into three types, are proposed.

At first, a method of impregnating liquid crystals into a porous polymer in which liquid crystals can be oriented at random. Secondly, a method of mixing and emulsifying a polymer and liquid crystals in a solvent and then evaporating the solvent to vulcanize the polymer. Thirdly, a method of mixing a monomer, an oligomer or a mixture thereof with liquid crystals to form a polymerizable composition, and polymerizing the composition, for example, by irradiation of heat or ultraviolet rays, by which the polymerized polymer and liquid crystals are put to phase separation.

SPIE.1080, 83, (1989) discloses a polymer dispersion type liquid crystal element in which the refractive index changes periodically inside as application of the polymer dispersion type liquid crystals. Specifically, as shown in FIG. 2, a structure in which polymer layers and polymer dispersion type liquid crystal layers are laminated alternately is manufactured to attain a layered structure in which the refractive index changes periodically. In this case, in a state where voltage is not applied, reflection light is formed based on the principle of an interference filter due to the periodical refractive index difference between the polymer dispersion type liquid crystal layer and the polymer layer (FIG. 2(a)). Further, when the voltage is applied, the refractive index of the polymer dispersion type liquid crystal layer is aligned with that of the polymer layer to provide a transparent state (FIG. 2(b)).

As shown in FIG. 2, in the existent polymer dispersion type liquid crystal element in which the refractive index changes periodically in the inside, orientation of low molecular (low molecular weight) liquid crystals in the droplets of the polymer dispersion type liquid crystal layer is at random for the entire polymer dispersion type liquid crystal layers. Accordingly, the refractive index of the polymer dispersion type liquid crystal layer is lowered to a value $\{n_o(3-v)+n_e\}/3$, in view of the primarily approximated refractive index $(n_e+2n_o)/3$ of the droplet, a value of the refractive index $(n_p:$ about $n_o)$ of the polymer in the polymer dispersion type liquid crystal layer and a value of the volumetric fraction (v) of the low molecular liquid crystal to the polymer in the polymer dispersion type liquid crystal layer. In this case, $n_p$ is a refractive index of the polymer, $n_o$ is a refractive index where the vibration direction of an electric field of light is perpendicular to the major axis of the liquid crystal molecule, and $n_e$ is a refractive index where the vibration direction of the electric field of light is in parallel with the major axis of the liquid crystal molecule. Therefore, the difference of the refractive index between the polymer dispersion type liquid crystal layer and the polymer layer is reduced to result in a problem that no high reflectance can be obtained.

Accordingly, in order to improve the reflectance of the polymer dispersion type liquid crystal element in which the refractive index changes periodically inside, a technique for aligning the orientation of the low molecular liquid crystals in the element has been sought, but such a technique has not been found yet.

As analogous techniques, several techniques for controlling the orientation direction of low molecular liquid crystals in droplets at the initial stage in PDLC have been proposed.

For example, (1) U.S. Pat. No. 5,188,760 discloses an orientation controlling technique by the combination of PDLC using a liquid crystal polymer and an orientation film. In this technique, a liquid crystal monomer is used for a polymerizable composition as a precursor of PDLC and the composition is injected into a cell having an orientation film. UV-light or heat is applied in this state to conduct polymer phase separation in a state where the liquid crystal polymer as a polymer of the liquid crystal monomer and low molecular liquid crystals are oriented in the direction of the orientation film, and orientation of the low molecular liquid crystals is fixed after vulcanizing of the liquid crystal monomer.

Further, (2) Japanese Published Unexamined Patent Application No. Hei 5-281527 discloses an orientation controlling technique by the combination of PDLC with a horizontal external magnetic field or electric field. In this technique, a polymerizable composition is injected into a cell with no orientation film and UV-light or heat is applied to the cell in a state of applying an external magnetic field or electric field in a horizontal direction, thereby conducting polymer phase separation in a state where the low molecular liquid crystals are oriented in the direction of the external magnetic field or electric field and fixing the orientation of the low molecular liquid crystals after vulcanizing the polymerizable composition.

Further, (3) Japan Display '92, 699 discloses an orientation controlling technique by the combination of PDLC and an orientation film. In this technique, a polymerizable composition as a precursor of PDLC is prepared so as to form a liquid crystal phase at an extremely high liquid crystal concentration, which is injected into a cell with an orientation film. In this state, the polymerizable composition in the form of the liquid crystal phase is oriented along the direction of the orientation film and, by conducting polymer phase separation inside the cell with the orientation film under the application of UV-light or heat in this state, orientation of the low molecular liquid crystals is fixed while keeping the state of the initial orientation.

Furthermore, (4) Mol. Mat., 2,295 (1993) discloses an orientation controlling technique using a polymer compound having a photo-dimerizable structure. In this technique, manufacture is conducted by an impregnation method using a polymeric compound having a photo-dimerizable structure as a material. At first, a composite film comprising a polymeric compound having a photo-dimerizable structure and a poor solvent to the polymeric compound is prepared and the poor solvent is extracted from the film, followed by drying to prepare a porous polymer comprising the polymeric compound having the photo-dimerizable structure. Further, the porous polymer is impregnated with low molecular liquid crystals to prepare PDLC comprising the polymeric compound having the photo-dimerizable structure. PDLC is irradiated with polarized light to cause photo-dimerization. The low molecular liquid crystals are oriented along with the structural change of the polymeric compound by the photo-dimerization.

Among them, however, the composite structure as shown in FIG. 2 could not be prepared by the orientation and fixing methods of (1) and (3) since the orientation film had to be used. Further, in the orientation fixing method (2), the external magnetic field or an electric field had to be applied in parallel with the cell but it was extremely difficult to apply an effective external magnetic field or electric field throughout the plane of the cell if the cell size was large.

For instance, Japanese Published Unexamined Patent Application No. Hei 5-281527 describes that the level of the external electric field has to be 1 kV/cm or higher in a case of applying the external magnetic field. Assuming the diagonal cell size to be 12 inches, it is calculated that about 350 kV or higher of an application voltage is necessary but the application voltage of such a high level cannot be attained easily. Further, in the method (4), since the porous polymer is prepared by use of the polymeric compound having the photo-dimerizable structure, injection of the liquid crystals has to be conducted by the impregnation method. Further, it is necessary for the film obtained in (4) that all interstices have to be in communication with the film surface for the impregnation of the liquid crystals. Independent interstices are not desirable since they cause residue of water or bubbles thus giving undesired effect on the reliability of the characteristics. Further, since the film has a flexibility, the film is liable to be deformed in the step of removing water and impregnating the liquid crystals, and it is difficult to control the film thickness upon appending opposing substrates to each other. Furthermore, in the method (4), it is impossible to manufacture a composite structure as the periodical structure shown in FIG. 2.

As described above, any of the existent liquid crystal orientation methods involves problems, and a polymer dispersion type liquid crystal element having a sufficient reflectance and in which the refractive index changes periodically inside has not been obtained yet.

OBJECT AND SUMMARY OF THE INVENTION

An object of the present invention is to overcome the foregoing problems in the prior art and the present invention has been accomplished based on the discovery of the following constitutions described below.

Namely, the present invention provides a polymer dispersion type liquid crystal element, comprising: a layer including a polymer and a low molecular liquid crystal dispersed in said polymer, and manufactured by conducting polymer phase separation of a polymerizable composition containing a polymerizable compound having a photo-dimerizable structure and said low molecular liquid crystals.

The present invention further provides a method of manufacturing a polymer dispersion type liquid crystal element which comprises conducting polymer phase separation of a polymerizable composition containing a polymerizable compound having a photo-dimerizable structure and low molecular liquid crystals and then irradiating polarized light, thereby causing reaction of photo-dimerization in the polymer, to orient the low molecular liquid crystals.

The present invention further provides a method of manufacturing a polymer dispersion type liquid crystal element which comprises applying polarized light to a polymerizable composition containing a polymerizable compound having a photo-dimerizable structure and low molecular liquid crystals, thereby conducting polymer phase separation and causing photo-dimerization simultaneously so as to orient the low molecular liquid crystals.

The present invention further provides a polymer dispersion type liquid crystal element manufactured by the manufacturing method described above, having a structure in which low molecular liquid crystals are oriented in the polymer dispersion type liquid crystal element and having a layered structure in which a refractive index changes periodically inside.

The present invention further provides a polymer dispersion type liquid crystal element comprising a composite structure of a photo-dimerizable polymer compound and low molecular liquid crystals and having a laminate structure in which a refractive index changes periodically inside.

The present invention further provides a method of manufacturing a polymer dispersion type liquid crystal element having a laminate structure in which a refractive index changes periodically inside, the method comprising repeating the following steps (a)–(f) successively:

(a) a step of coating, on a substrate, a polymerizable composition containing a polymerizable compound having a photo-dimerizable structure and low molecular liquid crystals;

(b) a step of conducting polymer phase separation of the polymerizable composition to prepare a polymer dispersion type liquid crystal layer;

(c) a step of irradiating the polymer dispersion type liquid crystal layer with polarized light to orient the low molecular liquid crystals;

(d) a step of coating a polymerizable composition containing a polymerizable compound having a photo-dimerizable structure and low molecular liquid crystals on the polymer dispersion type liquid crystal layer in which the low molecular liquid crystals are oriented;

(e) a step of conducting polymer phase separation of the polymerizable composition to prepare a polymer dispersion type liquid crystal layer; and (f) a step of irradiating the polymer dispersion type liquid crystal layer with polarized light having a vibration direction perpendicular to the polarized light used in (c) above to orient the low molecular liquid crystals.

The present invention further provides a method of manufacturing a polymer dispersion type liquid crystal having a laminate structure in which a refractive index changes periodically inside, the method comprising repeating the following steps (a)–(d) successively:

(a) a step of coating, on a substrate, a polymerizable composition containing a polymerizable compound having a photo-dimerizable structure and low molecular liquid crystals;

(b) a step of applying polarized light to the polymerizable composition, thereby conducting polymer phase separation and orienting the low molecular liquid crystals simultaneously, to prepare a polymer dispersion type liquid crystal layer;

(c) a step of coating a polymerizable composition containing a polymerizable compound having a photo-dimerizable structure and low molecular liquid crystals on the polymer dispersion type liquid crystal layer in which the low molecular liquid crystals are oriented; and (d) a step of applying polarized light to the polymerizable composition, thereby conducting polymer phase separation and orienting the low molecular liquid crystals, simultaneously, to prepare a polymer dispersion type liquid crystal.

BRIEF DESCRIPTION OF THE DRAWINGS

The present invention will be explained more specifically with reference to the accompanying drawings, wherein, FIG. 1 is a schematic view of an existent polymer dispersion type liquid crystal in which

FIG. 3 is a schematic view of a polymer dispersion type liquid crystal element according to the present invention in which

FIG. 4 is a view showing one of methods of manufacturing a polymer dispersion type liquid crystal element having a layered structure in which a refractive index changes periodically inside, in which

FIG. 5(g) shows a structure of a polymer dispersion type liquid crystal element of the present invention obtained by the manufacturing method.

FIG. 6(e) shows a structure of a polymer dispersion type liquid crystal element of the present invention obtained by the manufacturing method.

FIG. 8 is a graph showing an angle dependence of the transmission light intensity of polymer dispersion type liquid crystal elements in which F8 (A) shows the result for Example 2 and FIG. 8(B) shows the result for Comparative Example 2.

PREFERRED EMBODIMENTS OF THE INVENTION

At first, a method of manufacturing a polymer dispersion type liquid crystal element according to the present invention will be explained with reference to preferred embodiments.

For manufacturing a polymer dispersion type liquid crystal element according to the present invention, a polymerizable compound having a photo-dimerizable structure, low molecular liquid crystals and a polymerization initiator for polymerizable radicals are mixed to prepare a liquid polymerizable composition, which is then injected into a cell. When laser interference light is applied to the cell vulcanization of the polymerizable compound occurs to form a polymer layer of a low refractive index in a region in which the amplitude of the laser interface light is large. On the other hand, polymer phase separation occurs to form a polymer dispersion type liquid crystal layer of a high refractive index in a region in which the amplitude of the laser interference light is small. Since the region with large amplitude and a region with small amplitude of the laser interference light are alternately repeated spatially, a polymer dispersion type liquid crystal element having a layered structure in which a refractive index changes periodically is manufactured (FIG. 4(a)).

Figure 4A:
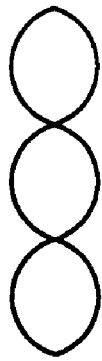
FIG. 4(a) shows a laser interference light irradiation state and FIG. 4(b) shows polarized light irradiation state.
Figure 4A:
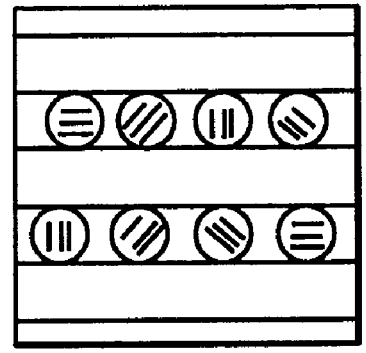
Figure 4B:
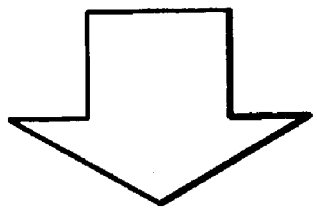
Figure 4B:
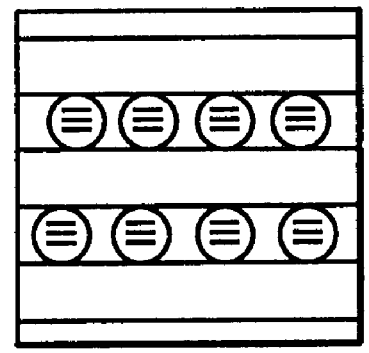

Orientation of the low molecular liquid crystals in the polymer dispersion type liquid crystal element is attained by applying uniformly polarized light to the polymer dispersion type liquid crystal element (FIG. 4(a)) manufactured as described above (FIG. 4 (b)). The wavelength of the polarized light varies depending on the kind of the polymeric compound having the photo-dimerizable structure, and light at 250 nm –350 nm may be used in the case of a cinnamate type compound. The irradiation time of the polarized light is preferably about from one minute to 120 minutes although varying depending on the sensitivity of the photo-dimerizable structure and the irradiation atmosphere.

In the case of using polarized light at such a wavelength that both of the polymeric compound having the photo-dimerizable structure and the polymerization initiator for the polymerizable compound have sensitivity to the light, polymer phase separation and orientation control for the low molecular liquid crystals can be conducted simultaneously.

Figure 5:
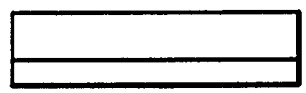
FIG. 5 is a view showing one of methods of manufacturing a polymer dispersion type liquid crystal element having a layered structure in which a refractive index changes periodically inside, in which FIGS. (a)–(f) show respective steps
Figure 5:
Figure 5:
Figure 5:
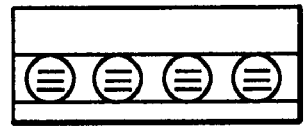
Figure 5:
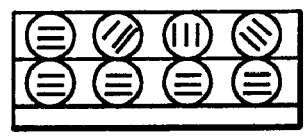
Figure 5:
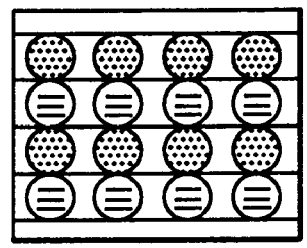
Figure 6:
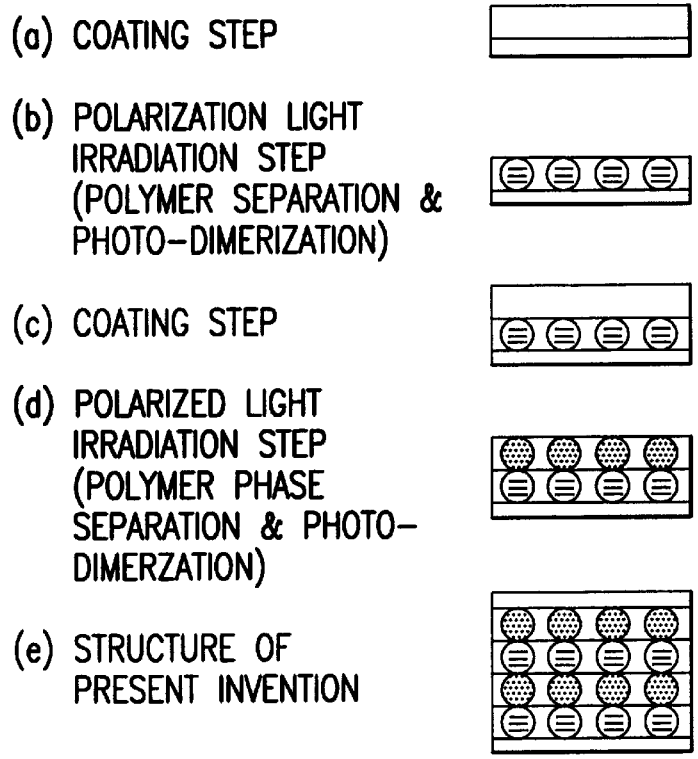
FIG. 6 is a view showing one of methods of manufacturing a polymer dispersion type liquid crystal element having a layered structure in which a refractive index changes periodically inside, in which FIGS. (a)–(d) show respective steps

Explanation will then be made about a method of manufacturing "a polymer dispersion type liquid crystal element having a laminate structure in which a refractive index changes periodically inside" according to the present invention. The manufacturing method of the present invention is based on a coating/lamination method of utilizing polymer phase separation and photo-dimerization, which includes a method of causing polymer phase separation and photo-dimerization successively and repeating them (FIG. 5) and a method of causing polymer phase separation and photo-dimerization simultaneously and repeating them (FIG. 6).

At first, explanation is to be made about the method of causing polymer phase separation and photo-dimerization successively and repeating them. As shown in FIG. 5, this method comprises:

(a) a step of coating, on a substrate, a polymerizable composition containing a polymerizable compound having a photo-dimerizable structure and low molecular liquid crystals;

(b) a step of conducting polymer phase separation of the polymerizable composition by application of light or heat to prepare a polymer dispersion type liquid crystal layer;

(c) a step of irradiating the polymer dispersion type liquid crystal layer with polarized light, thereby causing photo-dimerization in the polymeric compound having the photo-dimerizable structure to orient the low molecular liquid crystals;

(d) a step of coating a polymerizable composition containing a polymerizable compound having a photo-dimerizable structure and low molecular liquid crystals on the polymer dispersion type liquid crystal layer in which the low molecular liquid crystals are oriented;

(e) a step of conducting polymer phase separation of the polymerizable composition by applying light or heat to the polymerizable composition to prepare a polymer dispersion type liquid crystal layer and (f) a step of irradiating the polymer dispersion type liquid layer with polarized light having a vibration direction perpendicular to the polarized light used in the step (c) above, thereby causing photo-dimerization in the polymeric compound having the photo-dimerizable structure so as to orient the low molecular liquid crystals, and repeating the steps (a)–(f) successively, by which "a polymer dispersion type liquid crystal element having a laminate structure in which the refractive index changes periodically inside" as shown in FIG. 5(g) can be manufactured. For obtaining a regular layered structure, it is preferred to cause polymer phase separation by irradiation of a standing wave.

Then, explanation will be made to a method of conducting polymer phase separation and photo-dimerization simultaneously and repeating them. As shown in FIG. 6, this method comprises:

(a) a step of coating, on a substrate, a polymerizable composition containing a polymerizable compound having a photo-dimerizable structure and low molecular liquid crystals;

(b) a step of irradiating the polymerizable composition with polarized light, thereby conducting polymer phase separation and causing photo-dimerizable in the polymeric compound having the photo-dimerizable structure simultaneously to prepare a polymer dispersion type liquid crystal layer in which low molecular liquid crystals are oriented;

(c) a step of coating a polymerizable composition containing a photo-dimerizable structure and low molecular liquid crystals on the polymer dispersion type liquid crystal layer in which the low molecular liquid crystals are oriented and;

(d) a step of irradiating the polymerizable composition with polarized light having a vibration direction perpendicular to the polarized light used in the step (b) above, thereby conducting polymer phase separation and photo-dimerization of the polymerizable compound simultaneously to manufacture polymer dispersion type liquid crystals in which the low molecular liquid crystals are oriented and the steps (a)–(d) above are repeated successively, by which "a polymer dispersion type liquid crystal element having a laminate structure in which refractive index changes periodically inside" as shown in FIG. 5(g) can be manufactured. For obtaining a regular layered structure, it is preferred to conduct polymer phase separation by irradiation of a standing wave also in this method.

The polymerizable composition used in the present invention contains a polymerizable compound having a photo-dimerizable structure, a low molecular liquid crystal compound, and a polymerization initiator.

"Polymerizable compound having the photo-dimerizable structure" in the present invention has no particular restriction so long as it is a compound formed by providing a compound having a photo-dimerizable structure with an acryloyl group or methacryloyl group as a polymerizable radial or a derivative thereof. Examples of the compound or the derivative thereof can include, for example, 4-acryloyl-aminophenyl sulfonyl azide, 4-methacryloylaminophenyl sulfonyl azide, 2-p-azidebenzoylpropyl acrylate, 2-p-azidebenzoylpropyl methacrylate, cinnamyl acrylate, cinnamyl methacrylate, cinnamoyloxy ethyl acrylate, cinnamoyloxy ethyl methacrylate, cinnamylidene ethyl acrylate, and cinnamylidene ethyl mathacrylate. Among them, cinnamyl acrylate, cinnamyl methacrylate and cinnamoyloxy ethyl methacrylate can be used suitably. The "polymerizable compound having the photo-dimerizable structure" may be used alone or as a combination of a plurality of them. Further, "the polymerizable compound having the photo-dimerizable structure" has a photosensitivity by itself but it is preferred to use a sensitive dye or a sensitizer in combination in order to enhance the light sensitivity and select the light sensitive wavelength.

Further, as the liquid crystal compound constituting low molecular liquid crystals contained in the polymeric composition, there can be used, for example, nematic liquid crystals, cholesteric liquid crystals, smectic liquid crystals and ferroelectric liquid crystals, as well as various low molecular liquid crystal compounds that are used generally as electric field driven type display materials. Specific examples of the low molecular liquid crystal compounds can include, for example, various kinds of low molecular liquid crystal compounds such as biphenyl type, phenyl benzoate type, cyclohexyl benzene type, azoxybenzene type, azobenzene type, terphenyl type, biphenyl benzoate type, cyclohexyl biphenyl type, phenyl pyrimidine type, and cyclohexyl pyrimidine type compounds. The low molecular liquid crystal compounds mentioned above can be used alone or as a combination of a plurality of them like the low molecular liquid crystal materials used generally.

Further, the polymerizable composition used in the present invention contains the "polymerizable compound having the photo-dimerizable structure" as the essential constituent ingredient but may contain various other polymerizable compounds. Examples of such polymerizable compounds can include, for example, those mono-functional and poly-functional monomers such as alkyl acrylate, acrylamide, hydroxy acrylate, alkyl methacrylate, methacryloamide, hydroxy methacrylate, vinylpyrrolidone, styrene and its derivative, acrylonitrile, vinyl chloride, vinylidene chloride, ethylene, butadiene, isoprene, and vinyl pyridine.

Furthermore, the polymerizable composition of the present invention contains a polymerization initiator for polymerizing the polymerizable compound. The polymerization initiator can be selected from the materials having a sensitivity to the wavelength of the standing wave used when preparing a polymer dispersion type liquid crystal element in which the refractive index changes periodically inside. In the present invention, for example, N-phenylglycine or azoisobutyronitrile can be used suitably.

As the form of the device of the polymer dispersion type liquid crystal element according to the present invention, a structure put between cells each comprising two electrode plates is preferred like the case of usual liquid crystal display elements. As the electrode plate, for example, those substrates with transparent electrodes such as a glass substrate, a plastic film or a NESA glass substrate having ITO applied on the surface can be used suitably.

Figure 1A:
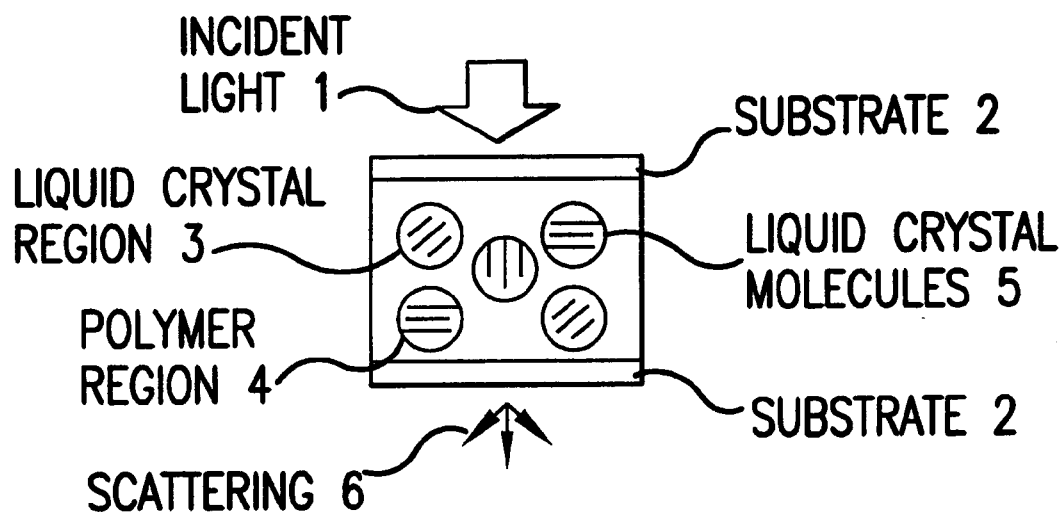
FIG. 1(a) shows a voltage-unapplied state and FIG. 1(b) shows a voltage-applied state.
Figure 1B:
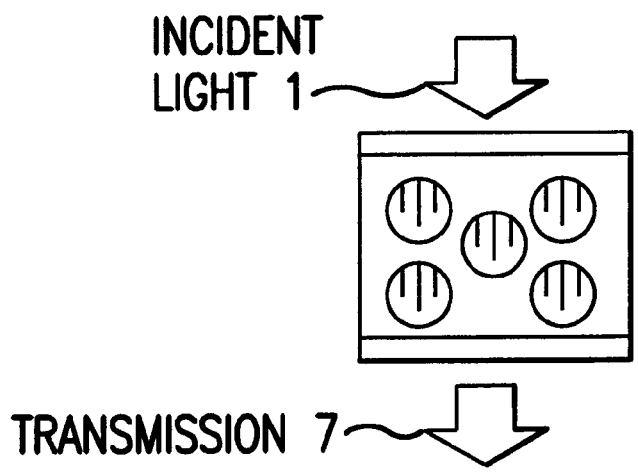
Figure 2A:
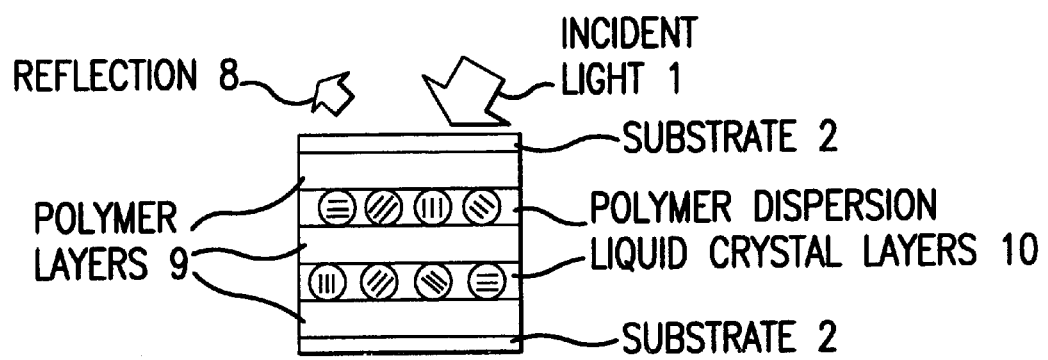
FIG. 2 is a schematic view of an existent polymer dispersion type liquid crystal element having a layered structure in which a refractive index changes periodically inside, in which FIG. 2 (a) shows a voltage-unapplied state
FIG. 2(b) shows a voltage-applied state.
Figure 2B:
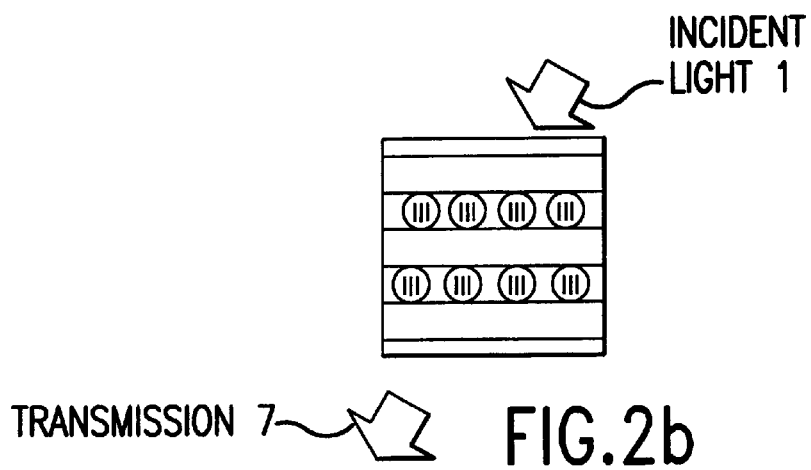
Figure 3A:
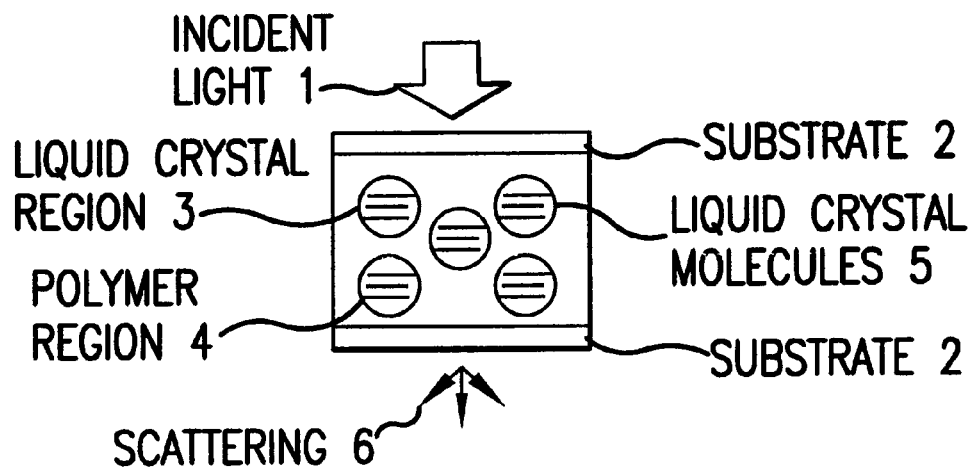
FIG. 3(a) shows a voltage-unapplied state and FIG. 3(b) shows a voltage applied state.
Figure 3B:
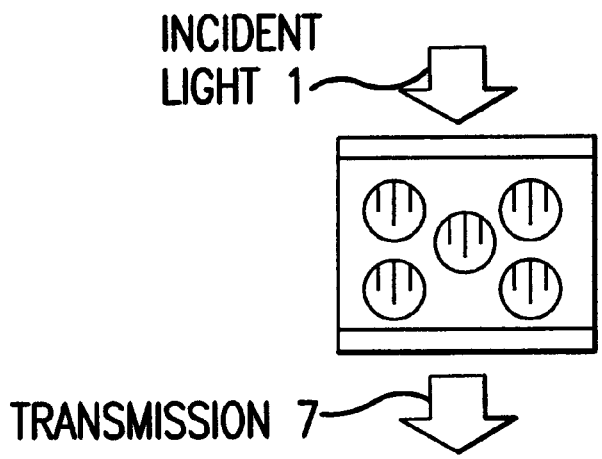

In the polymer dispersion type liquid crystal element comprising a composite structure of the polymeric compound having the photo-dimerizable structure and the low molecular liquid crystals and having the layered structure in which the refractive index changes periodically inside according to the present invention, when the polymeric compound having the photo-dimerizable structure is irradiated with the polarized light, the photo-dimerizable structure having an intense absorption in the direction parallel with the vibration direction of the polarized light reacts efficiently due to the anisotropy of the light absorption coefficient of thepolymeric compound having the photo-dimerizable structure, and the polymer in the polymer dispersion type liquid crystal is photo-dimerized. Then, the photo-dimerization is accompanied by the structural change of molecules, in which the low molecular liquid crystals are oriented in a specific direction in accordance with the structural change of the molecules directed in the specific direction (FIG. 3).

As a result, it is possible to manufacture a polymer dispersion type liquid crystal element, having a light reflectance higher than that of the existent polymer dispersion type liquid crystal element, and having a layered structure in which the refractive index changes periodically inside.

EMBODIMENTS

The present invention will be explained more specifically by way of examples.

Embodiment 1

Cinnamoyloxy ethyl methacrylate was synthesized as a polymerizable compound having a dimerizable structure. 0.08 g of the synthesized cinnamoyloxy ethyl methacrylate, 0.67 g of dipentaerythritol hexaacrylate as a polymerizable compound (manufactured by Nippon Kayaku Co., Ltd.), 3.5 mg of rose bengal as a polymerization initiator for the polymerizable compound (manufactured by Nippon Kayaku Co., Ltd.), 0.01 g of N-phenylglycine (manufactured by Wako Pure Chemicals Industries Ltd.) and 0.2 g of low molecular liquid crystals E7 (manufactured by Merck Japan Ltd.) were mixed to prepare a liquid polymerizable composition. Then, the polymerizable composition was injected into a cell (10 $\mu$m) formed by appending opposing quartz substrate with a transparent electrode (ITO). An Ar ion laser beam at 488 nm was separated into two beams, each of which was applied to the cell on the surface and rear face thereof. The two optical beams formed interference light in the cell. After applying the laser beam for 10 minutes, polarized UV-light from a high pressure mercury lamp as a light source was irradiated for 60 minutes to manufacture a polymer dispersion type liquid crystal element having a layered structure in which the refractive index changes periodically inside.

Embodiment 2

0.05 g of cinnamyl methacrylate (manufactured by Polyscience Co.) as the polymerizable compound having a dimerizable structure, 0.5 g of hexadiol acrylate as the polymerizable compound (manufactured by Nippon Kayaku Co., Ltd.), 1.5 mg of azoisobutyronitrile as the polymerization initiator for the polymerizable compound (manufactured by Wako Pure Chemicals Industries Ltd.) and 0.5 g of low molecular liquid crystals E7 (manufactured by Merck Japan Ltd.) were mixed to prepare a liquid polymerizable composition. The polymerizable composition was coated on a quartz substrate with a transparent electrode (ITO), and polarized UV-light from a high pressure mercury lamp as a light source was irradiated for 60 minutes, thereby conducting polymer phase separation and photo-dimerization simultaneously to manufacture a polymer dispersion type liquid crystal layer.

Embodiment 3

0.05 g of cinnamyl methacrylate as the polymerizable compound having a dimerizable structure (manufactured by Polyscience Co.), 0.05 g of hexadiol acrylate as the polymerizable compound (manufactured by Nippon Kayaku Co., Ltd.), 1.5 mg of azoisobutyronitrile as the polymerization initiator for the polymerizable compound (manufactured by Wako Pure Chemicals Industries Ltd.) and 0.5 g of low molecular liquid crystal E7 (manufactured by Merck Japan Ltd.) were mixed to prepare a liquid polymerizable composition. The polymerizable composition was coated on a quartz substrate with a transparent electrode (ITO) and reaction was caused to take place in an oven at 70° C. for 24 hours to prepare a polymer dispersion type liquid crystal layer. Polarized UV-light from a high pressure mercury lamp as a light source was irradiated for 60 minutes to conduct photo-dimerization. Then, the polymerizable composition was coated again on the polymer dispersion type liquid crystal layer and reaction was caused to take place in an oven at 70° C. for 24 hours to laminate a polymer dispersion type liquid crystal layer. Further, polarized UV-light having a vibration direction perpendicular to the direction in the previous process was irradiated for 60 minutes to conduct photo-dimerization. The above-mentioned steps were repeated to manufacture a polymer dispersion type liquid crystal element having a laminate structure in which the refractive index changes periodically inside.

Embodiment 4

0.05 g of cinnamyl methacrylate as the polymerizable compound having a dimerizable structure (manufactured by Polyscience Co.), 0.05 g of hexadiol acrylate as the polymerizable compound (manufactured by Nippon Kayaku Co., Ltd.), 1.5 mg of azoisobutyronitrile as a polymerization initiator for the polymerizable compound (manufactured by Wako Pure Chemicals Industries Ltd.) and 0.5 g of low molecular liquid crystal E7 (manufactured by Merck Japan Ltd.) were mixed to prepare a liquid polymerizable composition. The polymerizable composition was coated on a quartz substrate with a transparent electrode (ITO), polarized UV-light from a high pressure mercury lamp as a light source was irradiated for 60 minutes to conduct polymer phase separation and photo-dimerization, simultaneously, to prepare a polymer dispersion type liquid crystal layer. Then, the polymerizable composition was coated again on the polymer dispersion type liquid crystal layer, and polarized UV-light having a vibration direction perpendicular to the direction in the previous process was irradiated for 60 minutes, thereby conducting polymer phase separation and photo-dimerization simultaneously, to laminate a polymer dispersion type liquid crystal layer. The above-mentioned steps were repeated to manufacture a polymer dispersion type liquid crystal element of 10 $\mu$m in thickness, having a laminate structure in which the refractive index changes periodically inside.

Summarizing Examples 1–4 above, the polymer dispersion type liquid crystal element having the layered structure in which the refractive index changes periodically inside was manufactured in Example 1by conducting the polymer phase separation and then photo-dimerization simultaneously by use of the laser interference light. The polymer dispersion type liquid crystal layer was manufactured in Example 2 by conducting polymer phase separation and photo-dimerization simultaneously. The polymer dispersion liquid crystal element having the laminate structure in which the refractive index changes periodically inside was manufactured in Example 3 by the method of conducting the polymer phase separation and photo-dimerization successively. Further, the polymer dispersion type liquid crystal element having the layer structure in which the refractive index changes periodically inside was manufactured in Example 4 by the method of conducting the polymer phase separation and photo-dimerization simultaneously.

Comparative Example 1

A polymer dispersion type liquid crystal element having a layered structure in which the refractive index changes periodically inside was manufactured in the same manner as in Example 1, except for not using cinnamoyloxy ethyl methacrylate.

Comparative Example 2

A polymer dispersion type liquid crystal element layer was manufactured in the same manner as in Example 2 except for using unpolarized UV-light.

Comparative Example 3

A polymer dispersion type liquid crystal element having a layered structure in which the refractive index changes periodically inside was manufactured in the same manner as in Example 3 except for not using cinnamyl methacrylate.

Comparative Example 4

A polymer dispersion type liquid crystal element having a layered structure in which the refractive index changes periodically inside was manufactured in the same manner as in Example 4 except for not using cinnamyl methacrylate.

Test Example 1
(Evaluation for reflectance)

Using each of the polymer dispersion type liquid crystal elements manufactured in Examples 1, 3 and 4, and Comparative Examples 1, 3 and 4, the reflectance was evaluated by the following method.
(Reflectance Evaluation Method)

Figure 7:
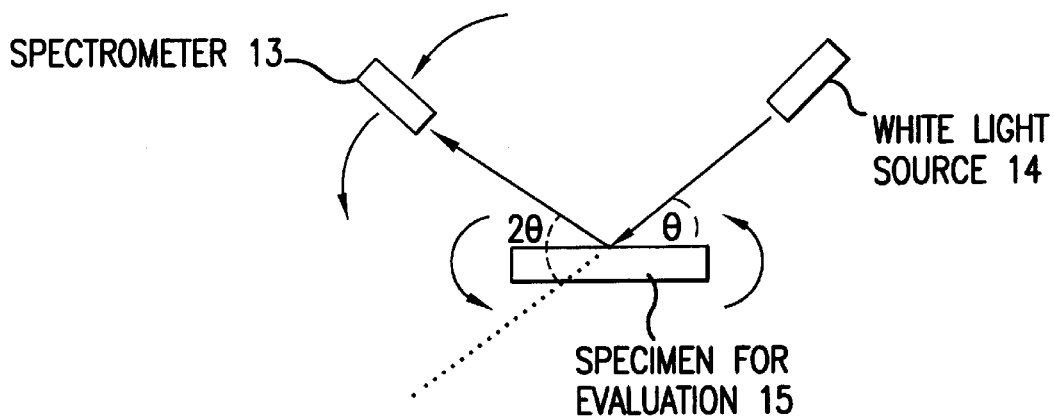
FIG. 7 is a chart showing an arrangement of an optical system used for the evaluation of reflectance.

The reflectance of the specimens to be evaluated was evaluated by an evaluation apparatus having Θ–2Θ optical system using a goniometer head, a white light source and a spectrometer in combination as shown in FIG. 7.
(Result of Evaluation for Reflectance)

As a criterion for the reflectance evaluation of the polymer dispersion type liquid crystal elements, the reflectance was expressed by "A" for 30% to 50%, by "B" for 50% to 70% and by "C" for 70% or more. The result are shown in Table 1.

TABLE 1

Result for the Evaluation of Reflectance

|  | Ex-ample 1 | Ex-ample 3 | Ex-ample 4 | Comp. Example 1 | Comp. Example 3 | Comp. Example 4 |
| --- | --- | --- | --- | --- | --- | --- |
| Reflec-tance (%) | 72 | 78 | 88 | 48 | 42 | 40 |
| Eval-uation | C | C | C | A | A | A |

As apparent from Table 1, the specimens for evaluation in Examples 1, 3, 4 show remarkably higher reflectance compared with that of the specimens for evaluation in Comparative Examples 1, 3, and 4.

Test Example 2
(Evaluation for Orientation Characteristics)

Each of the polymer dispersion type liquid crystal elements manufactured in Example 1 and Comparative Example 2 was used as the specimen for evaluation and the orientation characteristics were evaluated by the following method.
(Evaluation Method for Orientation Characteristics)

A polarizer and an analyzer were disposed in parallel (crossed nicol state) under a polarized microscope, and white light (incident light) was irradiated perpendicularly to the specimen for evaluation. The specimen for evaluation was rotated within a plane perpendicular to the incident light and the transmission light intensity from the specimen was detected by a photodiode to examine dependence of the transmission light intensity on the angle.
(Evaluation Result for Orientation Characteristics)

Figure 8:
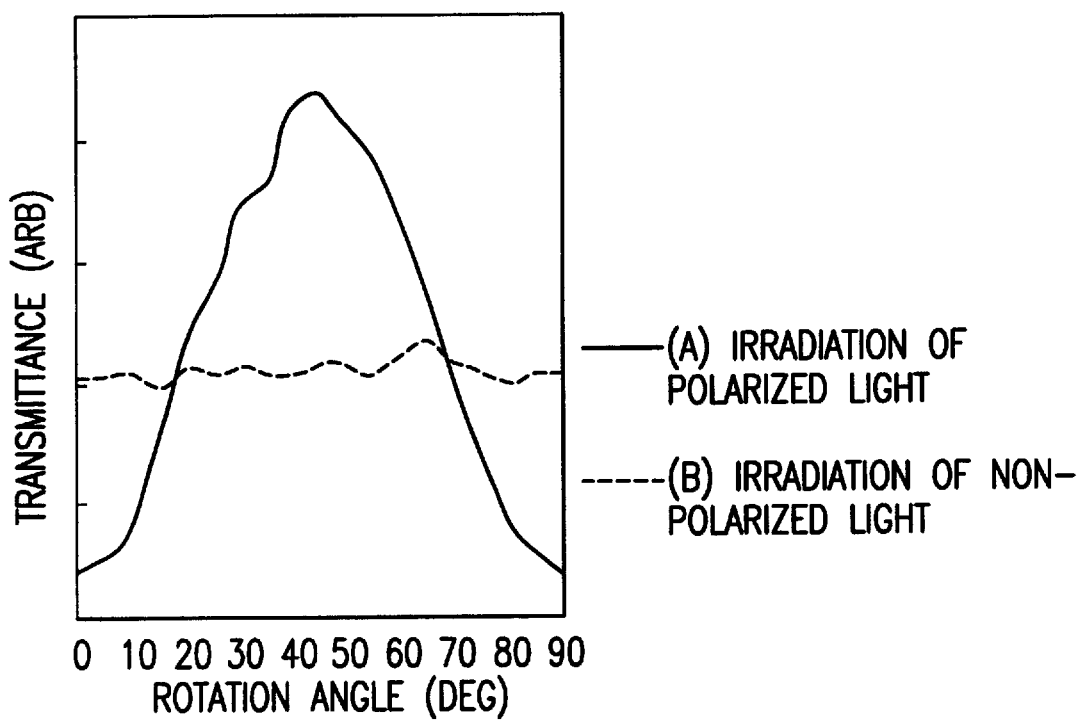

Evaluation results of the orientation characteristics are shown in FIG. 8. In FIG. 8, (A) and (B) are results for Example 2 and Comparative Example 2 respectively. It can be seen that liquid crystals are oriented and the polymer dispersion type liquid crystal element has an optical anisotropy in FIG. 8(A), whereas the optical anisotropy is absent in FIG. 8(B). From the results, it has been found that the polymer dispersion type liquid crystal element according to the present invention has the low molecular liquid crystals oriented in the element and has optical anisotropy as the element.

According to the present invention, the orientation of the low molecular liquid crystals can be controlled in the polymer dispersion type liquid crystal element having the layered structure in which the refractive index changes periodically inside according to the present invention. Further, the method of the present invention can provide a polymer dispersion type liquid crystal element of higher light reflectance compared with existent polymer dispersion type liquid crystal elements and having a layered structure in which the refractive index changes periodically inside.

What is claimed is:

1. A polymer dispersion type liquid crystal element, comprising: a layer including a polymer and a low molecular weight liquid crystal dispersed in said polymer, and manufactured by conducting polymer phase separation of a polymerizable composition containing a polymerizable compound having a photo-dimerizable structure and said low molecular weight liquid crystals.

2. The polymer dispersion type liquid crystal element as claimed in claim 1, wherein the polymerizable compound having the photo-dimerizable structure is selected from the group consisting of 4-acryloylaminophenyl sulfonyl azide, 4-methacryloylaminophenyl sulfonyl azide, 2-p-azidebenzoylpropyl acrylate, 2-p-azidebenzoylpropyl methacrylate, cinnamyl acrylate, cinnamyl methacrylate, cinnamoyloxy ethyl acrylate, cinnamoyloxy ethyl methacrylate, cinnamylidene ethyl acrylate, and cinnamylidene ethyl methacrylate.

3. The polymer dispersion type liquid crystal element as claimed in claim 2, wherein the polymerizable compound having the photo-dimerizable structure is cinnamyl acrylate, cinnamyl methacrylate or cinnamoyloxy ethyl methacrylate.

4. The polymer dispersion type liquid crystal element as claimed in claim 1, wherein the low molecular weight liquid crystals dispersed being independent of each other in the polymeric compound.

5. A method of manufacturing a polymer dispersion type liquid crystal element, comprising: conducting polymer phase separation of a polymerizable composition containing a polymerizable compound having a photo-dimerizable structure and low molecular liquid crystals and then applying irradiation of polarized light, thereby causing reaction of photo-dimerization in the polymer.

6. The method of manufacturing a polymer dispersion type liquid crystal element as claimed in claim 5, wherein the polymer phase separation is conducted by irradiation of laser interference light.

7. The polymer dispersion type liquid crystal element manufactured by the method as claimed in claim 5, having a structure in which the low molecular weight liquid crystals are oriented in the polymer dispersion type liquid crystal element.

8. The polymer dispersion type liquid crystal element as claimed in claim 7, having a layered structure in which a refractive index changes periodically inside.

9. The method of manufacturing a polymer dispersion type liquid crystal element as claimed in claim 5, wherein the polymerizable compound having the photo-dimerizable structure is selected from the group consisting of 4-acryloylaminophenyl sulfonyl azide, 4-methacryloylaminophenyl sulfonyl azide, 2-p-azidebenzoylpropyl acrylate, 2-p-azidebenzoylpropyl methacrylate, cinnamyl acrylate, cinnamyl methacrylate, cinnamoyloxy ethyl acrylate, cinnamoyloxy ethyl methacrylate, cinnamylidene ethyl acrylate, and cinnamylidene ethyl mathacrylate.

10. The method of manufacturing a polymer dispersion type liquid crystal element as claimed in claim 9, wherein the polymerizable compound having the photo-dimerizable structure is cinnamyl acrylate, cinnamyl methacrylate or cinnamoyloxy ethyl methacrylate.

11. A method of manufacturing a polymer dispersion type liquid crystal element, comprising: applying polarized light to a polymerizable composition containing a polymerizable compound having a photo-dimerizable structure and low molecular weight liquid crystals, thereby conducting polymer phase separation and causing photo-dimerization simultaneously so.

12. The polymer dispersion type liquid crystal element manufactured by the method as claimed in claim 11, having a structure in which the low molecular weight liquid crystals are oriented in the polymer dispersion type liquid crystal element.

13. The polymer dispersion type liquid crystal element as claimed in claim 12, having a layered structure in which a refractive index changes periodically inside.

14. The method of manufacturing a polymer dispersion type liquid crystal element as claimed in claim 11, wherein the polymerizable compound having the photo-dimerizable structure is selected from the group consisting of 4-acryloylaminophenyl sulfonyl azide, 4-methacryloylaminophenyl sulfonyl azide, 2-p-azidebenzoylpropyl acrylate, 2-p-azidebenzoylpropyl methacrylate, cinnamyl acrylate, cinnamyl methacrylate, cinnamoyloxy ethyl acrylate, cinnamoyloxy ethyl methacrylate, cinnamylidene ethyl acrylate, and cinnamylidene ethyl mathacrylate.

15. The method of manufacturing a polymer dispersion type liquid crystal element as claimed in claim 14, wherein the polymerizable compound having the photo-dimerizable structure is cinnamyl acrylate, cinnamyl methacrylate or cinnamoyloxy ethyl methacrylate.

16. A polymer dispersion type liquid crystal element, comprising: a composite structure of a photo-dimerized polymeric compound and low molecular weight liquid crystals and having a structure in which a refractive index changes periodically inside.

17. A method of manufacturing a polymer dispersion type liquid crystal element as claimed in claim 16, wherein a standing wave is irradiated to a polymerizable composition containing a polymerizable compound having a photo-polymerizable structure and low molecular weight liquid crystals, thereby conducting polymer phase separation.

18. The method of manufacturing a polymer dispersion type liquid crystal element as claimed in claim 16, wherein the polymer phase separation is conducted and then polarized light is applied to orient low molecular weight liquid crystals in the layer.

19. The method of manufacturing a polymer dispersion type liquid crystal element as claimed in claim 16, wherein the polymerizable compound having the photo-dimerizable structure is selected from the group consisting of 4-acryloylaminophenyl sulfonyl azide, 4-methacryloylaminophenyl sulfonyl azide, 2-p-azidebenzoylpropyl acrylate, 2-p-azidebenzoylpropyl methacrylate, cinnamyl acrylate, cinnamyl methacrylate, cinnamoyloxy ethyl acrylate, cinnamoyloxy ethyl methacrylate, cinnamylidene ethyl acrylate, and cinnamylidene ethyl methacrylate.

20. The method of manufacturing a polymer dispersion type liquid crystal element as claimed in claim 19, wherein the polymerizable compound having the photo-dimerizable structure is cinnamyl acrylate, cinnamyl methacrylate or cinnamoyloxy ethyl methacrylate.

21. The polymer dispersion type liquid crystal element as claimed in claim 16, wherein the polymerizable compound having the photo-dimerizable structure is selected from the group consisting of 4-acryloylaminophenyl sulfonyl azide, 4-methacryloylaminophenyl sulfonyl azide, 2-p-azidebenzoylpropyl acrylate, 2-p-azidebenzoylpropyl methacrylate, cinnamyl acrylate, cinnamyl methacrylate, cinnamoyloxy ethyl acrylate, cinnamoyloxy ethyl methacrylate, cinnamylidene ethyl acrylate, and cinnamylidene ethyl mathacrylate.

22. The polymer dispersion type liquid crystal element as claimed in claim 21, wherein the polymerizable compound having the photo-dimerizable structure is cinnamyl acrylate, cinnamyl methacrylate or cinnamoyloxy ethyl methacrylate.

23. The polymer dispersion type liquid crystal element as claimed in any of claim 16, wherein the low molecular weight liquid crystals dispersed being independent of each other in the polymeric compound.

24. A polymer dispersion type liquid crystal element, which is manufactured by the method as claimed in claim 18, comprising a composite structure of a photo-dimerized polymer compound and low molecular liquid crystals and having a laminate structure in which a refractive index changes eriodically inside.

25. A method of manufacturing a polymer dispersion type liquid crystal element as claimed in claim 16, said method comprising repeating the following steps (a)–(f) successively:

(a) a step of coating, on a substrate, a polymerizable composition containing a polymerizable compound having a photo-dimerizable structure and low molecular weight liquid crystals;

(b) a step of conducting polymer phase separation of said polymerizable composition to prepare a polymer dispersion type liquid crystal layer;

(c) a step of irradiating said polymer dispersion type liquid crystal layer with polarized light to orient the low molecular weight liquid crystals;

(d) a step of applying coating of a polymerizable composition containing a polymerizable compound having a photo-dimerizable structure and low molecular weight liquid crystals onto said polymer dispersion type liquid crystal layer in which the low molecular weight liquid crystals are oriented;

(e) a step of conducting polymer phase separation of said polymerizable composition to prepare a polymer dispersion type liquid crystal layer; and (f) a step of irradiating said polymer dispersion type liquid crystal layer with polarized light having a vibration direction perpendicular to the polarized light used in the step (c) above to orient the low molecular weight liquid crystals.

26. The method of manufacturing a polymer dispersion type liquid crystal element as claimed in claim 25, wherein the polymerizable compound having the photo-dimerizable structure is selected from the group consisting of 4-acryloylaminophenyl sulfonyl azide, 4-methacryloylaminophenyl sulfonyl azide, 2-p-azidebenzoylpropyl acrylate, 2-p-azidebenzoylpropyl methacrylate, cinnamyl acrylate, cinnamyl methacrylate, cinnamoyloxy ethyl acrylate, cinnamoyloxy ethyl methacrylate, cinnamylidene ethyl acrylate, and cinnamylidene ethyl mathacrylate.

27. The method of manufacturing a polymer dispersion type liquid crystal element as claimed in claim 26, wherein the polymerizable compound having the photo-dimerizable structure is cinnamyl acrylate, cinnamyl methacrylate or cinnamoyloxy ethyl methacrylate.

28. The method of manufacturing a polymer dispersion type liquid crystal as claimed in claim 16, said method comprising repeating the following steps (a)–(d) successively:

(a) a step of coating a substrate with a polymerizable composition containing a polymerizable compound having a photo-dimerizable structure and low molecular weight liquid crystals;

(b) a step of irradiating said polymerizable composition with polarized light, thereby conducting polymer phase separation and orienting the low molecular weight liquid crystals simultaneously, to prepare a polymer dispersion type liquid crystal layer;

(c) a step of applying coating of a polymerizable composition containing a polymerizable compound having a photo-dimerizable structure and low molecular weight liquid crystals onto said polymer dispersion type liquid crystal layer in which the low molecular weight liquid crystals are oriented; and (d) a step of irradiating said polymerizable composition with polarized light, thereby conducting polymer phase separation and orienting the low molecular liquid crystals, simultaneously, to prepare a polymer dispersion type liquid crystal.

29. The method of manufacturing a polymer dispersion type liquid crystal element as claimed in claim 24, wherein the polymerizable compound having the photo-dimerizable structure is selected from the group consisting of 4-acryloylaminophenyl sulfonyl azide, 4-methacryloylaminophenyl sulfonyl azide, 2-p-azidebenzoylpropyl acrylate, 2-p-azidebenzoylpropyl methacrylate, cinnamyl acrylate, cinnamyl methacrylate, cinnamoyloxy ethyl acrylate, cinnamoyloxy ethyl methacrylate, cinnamylidene ethyl acrylate, and cinnamylidene ethyl methacrylate.

30. The method of manufacturing a polymer dispersion type liquid crystal element as claimed in claim 29, wherein the polymerizable compound having the photo-dimerizable structure is cinnamyl acrylate, cinnamyl methacrylate or cinnamoyloxy ethyl methacrylate.

* * * * *